United States Patent [19]

Kiuchi et al.

[11] Patent Number: 5,268,884
[45] Date of Patent: Dec. 7, 1993

[54] SEEK CONTROL METHOD AND APPARATUS FOR DISK APPARATUS

[75] Inventors: Tsutomu Kiuchi, Yokohama; Toshifumi Hatagami, Machida; Shuhei Moriyoshi, Yokohama, all of Japan

[73] Assignee: Fujitsu Limited, Kawasaki, Japan

[21] Appl. No.: 700,154

[22] PCT Filed: Sep. 13, 1990

[86] PCT No.: PCT/JP90/01176

§ 371 Date: Apr. 29, 1992

§ 102(e) Date: Apr. 29, 1992

[87] PCT Pub. No.: WO91/04558

PCT Pub. Date: Apr. 4, 1991

[30] Foreign Application Priority Data

Sep. 13, 1989 [JP] Japan .................................. 1-238085

[51] Int. Cl.$^5$ ............................................ G11B 21/08
[52] U.S. Cl. ...................................... 369/33; 369/215; 360/78.04; 395/275
[58] Field of Search ...................... 360/74.1, 71, 73.01, 360/73.03, 77.07, 78.04, 78.06, 78.07; 369/33, 215, 230; 395/275

[56] References Cited

U.S. PATENT DOCUMENTS

| 4,498,146 | 2/1985 | Martinez | 364/900 |
| 4,691,310 | 9/1987 | Wine | 360/73.03 |
| 4,803,573 | 2/1989 | Minoura et al. | 360/78.13 |
| 4,809,120 | 2/1989 | Ozawa | 360/78.13 |
| 4,813,011 | 3/1989 | Kulakowski et al. | 395/275 |
| 4,925,828 | 6/1990 | Frissell | 395/275 |
| 5,206,943 | 4/1993 | Callison et al. | 395/275 |

FOREIGN PATENT DOCUMENTS

| 0295015 | 12/1988 | European Pat. Off. . |
| 54-155807 | 12/1979 | Japan . |
| 57-105061 | 6/1982 | Japan . |
| 62-92022 | 4/1987 | Japan . |

Primary Examiner—Edward K. Look
Assistant Examiner—Michael S. Lee
Attorney, Agent, or Firm—Staas & Halsey

[57] ABSTRACT

A seek control apparatus for a disk apparatus includes the steps of performing a seek operation in which a head (6) is moved from a first position on a recording medium to a second position under control of a processor (4) receiving a first command from an external device (113, 116, 117), and setting a load state of the processor to a state where the processor can accept a command during executing the step (E). Then it is determined whether or not a second command has been supplied to the processor from the external device during a time the step is being executed (121). The seek operation is stopped between the first position and the second position when it is determined by the just above step that the second command has been supplied to the processor (121, 122, 123, 125).

24 Claims, 10 Drawing Sheets

SEEK CONTROL METHOD AND APPARATUS FOR DISK APPARATUS

BACKGROUND OF THE INVENTION

1. Technical Field

The present invention relates to a seek control method and apparatus for an auxiliary storage device in a computer system.

Recently, it has been required that an auxiliary storage device which stores a large amount of data and which is used as a virtual memory operates at a higher speed as a computer main frame operates at a higher speed. In order to meet this requirement, it is necessary to reduce an access time of the auxiliary storage device. In order to reduce the access time, it is necessary to carry out a seek control directed to reducing a seek time.

Background Art

A conventional magnetic disk device or a conventional optical disk device, which serves as an auxiliary storage device in a computer system, has a possibility that even when a command to read data is issued by a high-order device during a seek operation in which a head is moving from a cylinder (track) to another track, this command is not allowed to be carried out until the seek operation is completed.

The above will be described in the case of a magnetic disk apparatus. Normally, the magnetic disk apparatus employs a method called a read ahead cache. For example, readout data is transferred to a high-order device such as a host computer, in response to a data readout command from the high-order device, and thereafter data subsequent to the above readout data is read ahead and written into a cache memory provided in a controller of the magnetic disk apparatus (read ahead cache mechanism). If there is a continuous defect in an area of a magnetic disk medium read out by the read command during such a read ahead operation, an alternative process is carried out in which an alternative area of the defective area is provided in another cylinder. When consecutive data are read ahead, a seek operation for moving the head to the alternative area is carried out. The alternative process as described above is disclosed in U.S. Pat. 4,498,146. However, in many cases, the alternative cylinder is assigned on the outermost or innermost periphery side of the magnetic disk other than cylinders which are used most frequently. Thus, the seeking from the read ahead area having a defect to the alternative area uses a long distance.

When such a long-distance seek is carried out, the magnetic head is moved at a high speed in order to reduce the seek time. Thus, when the moving speed of the magnetic head becomes equal to or higher than a certain speed, a magnetic disk controller cannot accept a command from the high-order device due to the control of the movement of the magnetic disk for the following reason.

As indicated by F shown in FIG. 1, long-distance seeking is controlled so that the moving speed of the magnetic head becomes equal to a target speed. That is, the difference between a cylinder on which the magnetic head is now positioned and a target cylinder is obtained, and a target speed curve making it possible for the magnetic head to need the shortest time to move in accordance with the obtained difference is determined. Then, the movement control to the head is carried out while a speed control is being performed, so that the real speed of the magnetic head is the same as the speed defined by the target speed curve. This speed control is carried out by a microprocessor (MPU) in the magnetic disk controller. The MPU always detects the current position of the magnetic head and outputs, to a servo control circuit, the number of remaining cylinders necessary to move the magnetic head from the current position to the target position by detecting a track crossing pulses (generated each time the head passes over each track). Assuming now that each track (cylinder) is 17.5 $\mu$m wide and the maximum speed of the magnetic head is 2 m/s, it takes 8.75 $\mu$s for the magnetic head to cross each track. Thus, in order to read the track crossing pulse, it is necessary to monitor the track crossing pulse at intervals shorter than the above-mentioned track crossing time.

As has been described above, it is necessary to carry out a process for the speed control at intervals approximately equal to 7 $\mu$s in order to perform the above-mentioned process by means of the MPU. Thus, during the time the seek operation is being carried out, the microprocessor has less operational margin, and thus cannot perform another job. For example, it is actually difficult to accept a next access command from the high-order device and stop the seek operation when the head is halfway to the target. For the above-mentioned reasons, conventionally, when the procedure for having access to the alternative area is requested during the data read ahead control, the seek operation is not carried out for the alternative area at this time, and the data read ahead operation is stopped, so that the microprocessor is set to a status where it can immediately accept the next incoming command.

A further description will now be given of the problems of the conventional seek method. FIG. 2 is a flowchart of a conventional seek method for use in magnetic heads. Steps 101–103 shown in FIG. 2 relate to a procedure for preparing to start the seek operation, and steps 106–108 relate to a deceleration period. At step 101, a microprocessor of a magnetic disk apparatus (not shown) determines whether or not a command received from a high-order device is a seek command. When it is determined, at step 101, that the command from the high-order device is not the seek command, the microprocessor executes a process next requested. When it is determined, at step 101, that the command is the seek command, at step 102, the microprocessor calculates a positional difference between the current cylinder stored in its own register and a target cylinder received from the high-order device, and a direction in which the magnetic head should move. Then, the microprocessor determines an amount of movement of the magnetic head and the seek direction (movement direction of the head), and writes these data into its own register. At step 103, the microprocessor supplies a seek control circuit (not shown) with the head movement amount and the direction, and starts the seek operation.

At subsequent step 104, the microprocessor judges whether or not a track crossing signal has been obtained by reading a servo signal of the magnetic disk at intervals equal to or less than intervals between successive track cross signals which will be obtained when the head moves at a maximum speed. When the generation of the track cross signal is confirmed at step 104, at step 105, the microprocessor decrements the movement amount registered in its own register, that is, the number of cylinders obtained up to the target cylinder, by 1. Then, the microprocessor supplies the seek control circuit with a new movement amount obtained by the above-mentioned decrement operation. At step 106, the microprocessor judges whether or not the current head position is located at a cylinder position when the decelerating operation of the head should be started to stop the head on the target cylinder. That is, in order to stop the head on the target cylinder, it is necessary to decelerate the head a few cylinders ahead of the target cylinder. For this requirement, the predetermined target speed curve defines the portion where the decelerating operation should be started When the result of the judgment at step 106 shows that the head has not yet reached the position where the deceleration should be started, the procedure returns to step 104. On the other hand, when it is determined, at step 106, that the head has reached the position where the decelerating should be started, at step 107, the microprocessor outputs the deceleration instruction to a seek control circuit to start the deceleration. At subsequent step 108, the microprocessor judges whether or not the track cross signal has been generated in the same way as has been mentioned above. When it is judged that the track cross signal has been generated, the microprocessor reduces the number of cylinders existing up to the target cylinder at step 109. When it is determined, at step 110, that the head has reached on the target cylinder, that is, when the content of the register has become zero, the microprocessor ends the seek operation, and executes a control related to the target cylinder (on-track control). On the other hand, when the result obtained at step 110 shows that the head has not yet reached the target cylinder, the procedure returns to step 108.

FIG. 3(A) shows the relationship between the head movement speed v and time t; FIG. 3(B) shows the relationship between a driving current I of a voice coil motor (VCM) used for moving the head and time t. FIG. 3(C) shows the relationship between the head movement distance and the time. In FIG. 3, ① corresponds to the process consisting of the steps 101–103, ② corresponds to the process consisting of the steps 104–106, ③ corresponds to the process of step 107, and ④ corresponds to the process carried out when it is determined, at step 108, that the head has reached the target cylinder.

As has been previously discussed, since the maximum movement speed of the head is approximately 2 |m/s ↑, and the track (cylinder) width is approximately 17.5 |μm ↑, the processing time is approximately 8.75 ns. However, since it takes approximately 7 μs to obtain the number of track cross signals up to the target cylinder, the MPU does not have an operational margin and cannot accept an interrupt process or the like.

SUMMARY OF THE INVENTION

It is a general object of the present invention to provide a seek control method and apparatus in which the above-mentioned problems are eliminated.

A more specific object of the present invention is to provide a seek control method and apparatus having an improved throughput.

The above-mentioned objects are achieved by a seek control method for a disk apparatus comprising the steps of: (a) performing a seek operation of moving a head from a first position on a recording medium to a second position under control of a processor receiving a first command from an external device; (b) setting a load state of the processor to a state where the processor can accept a command during executing the step (a); (c) determining whether or not a second command has been supplied to the processor from the external device during a time the step (a) is being executed; and (d) stopping the seek operation of moving the head from the first position to the second position when it is determined by the step (c) that the second command has been supplied to the processor.

The above-mentioned objects of the present invention are also achieved by a seek control method for a disk apparatus comprising: (a) performing a seek operation moving a head from a first position on a recording medium to a second position under control of a first processor receiving a first command from an external device; (b) determining whether or not a second command has been supplied to the first processor from the external device during a time the step (a) is being executed; and (c) stopping the seek operation of moving the head from the first position to the second position when it is determined by the step (b) that the second command has been supplied to the first processor.

The aforementioned objects of the present invention are also achieved by a seek control apparatus for a disk apparatus comprising: first means for carrying out a seek operation of moving a head from a first position on a recording medium to a second position under control of a processor receiving a first command from an external device; second means for setting a load state of the processor to a state where the processor can accept a command during the seek operation; third means for determining whether or not a second command has been supplied from the external device during the seek operation; and fourth means for stopping the seek operation of moving the head from the first position to the second position when the third means determines that the second command has been supplied to the processor.

The aforementioned objects of the present invention are also achieved by a seek control apparatus for a disk apparatus comprising: a first processor receiving a first command from an external device and carrying out a seek operation of moving a head from a first position on a recording medium to a second position thereon; a second processor determining whether or not a second command has been supplied from the external device during the seek operation; and means for stopping the seek operation of moving the head to the second position from the first position when the second processor determines that the second command has been supplied to the second processor.

DETAILED DESCRIPTION OF THE PREFERRED EMBODIMENT

A description will now be give of the first embodiment of the present invention with reference to FIGS. 4 through 8.

Figure 4:
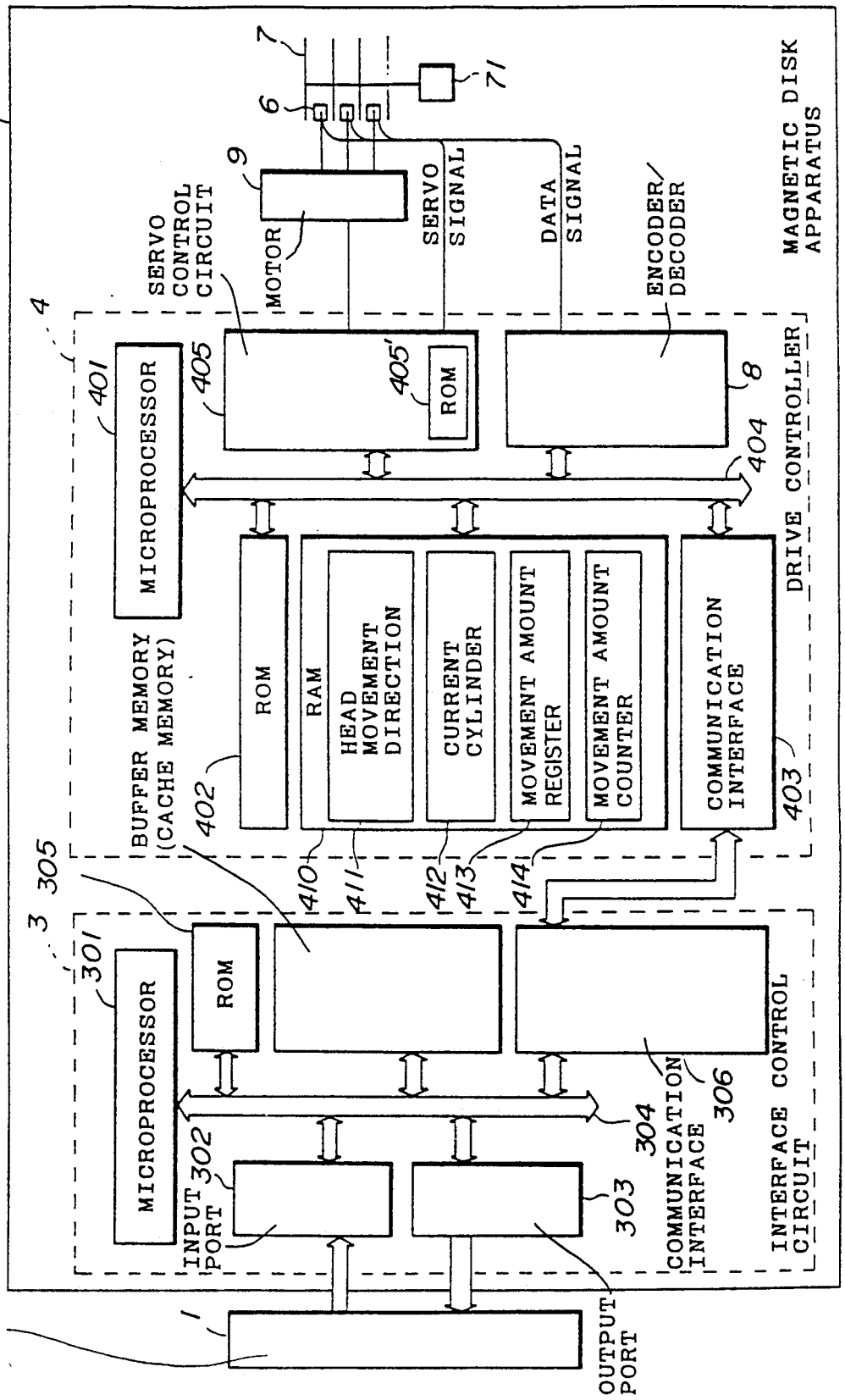
FIG. 4 is a block diagram of a first embodiment of the present invention.

Referring to FIG. 4, a device according to the embodiment of the present invention has a high-order device 1, and a magnetic disk apparatus 2 controlled by the high-order device 1. The magnetic disk apparatus 2 has an interface control circuit 3, a drive controller 4, a head 6, a magnetic disk 7, a motor 9 for driving the head, and a motor 71 for rotating the magnetic disk.

The interface control circuit 3 controls the decoding of a command from the high-order device and a data transfer between the magnetic disk apparatus 2 and the high-order device 1. Such operations of the interface control circuit 3 are executed by a microprocessor 301. The microprocessor 301 can access an input port 302, an output port 303, ROM 305, a buffer memory (cache memory) 5, and a communication interface 306 via a bus 304.

The microprocessor 301 performs various controls by executing microprograms stored in the ROM 305. For example, when the input port 302 receives a command from the high-order device 1, the microprocessor 301 is informed of the receipt of this command by an interrupt. Then, the microprocessor 301 accesses the input port 302, and decodes the accepted command. During the time the input port 302 is receiving write data supplied from the high-order device 1, the microprocessor 301 controls the bus 304 so that the input port 302 is connected to the communication interface 306, and transfers the write data from the high-order device 1 to the drive controller 4. On the other hand, read data transferred from the drive controller 4 is transferred to the high-order device 1 by connecting the communication interface 306 and the output port 303. In the case where read data is stored in the buffer memory 5, the microprocessor 301 connects the communication interface 306 and the buffer memory 5 together, and stores the read data in the buffer memory 5.

On the other hand, the drive controller 4 is connected to the interface control circuit 3, and performs a servo control and seek control of the head actuator. Such controls are executed by a microprocessor 401 of the drive controller 4. The microprocessor 401 controls the bus 404 and can access a ROM 402, a RAM 410, a communication interface 403, a servo control circuit 405, an encoder/decoder 8.

Microprograms executed by the microprocessor 401 are stored in the ROM 402.

The RAM 410 stores flags and data necessary for processes in a work area for data processing. The ROM 410 has a flag 411 indicating the head movement direction, a current cylinder address 412, a movement amount register 413 storing the difference between the current cylinder address and a target cylinder address instructed by a read command or write command from the high-order device 1, that is, a head movement amount, and a counter 414 showing an amount of movement obtained during the seek operation. They are used for a control in the same way as the control which has been described with reference to FIG. 2.

The communication interface 403 realizes command and data communications with the interface control circuit 3.

The servo control circuit 405 operates under the control of the microprocessor 401, and outputs the head movement direction, the movement amount and a deceleration starting signal from the microprocessor 401. The servo control circuit 405 receives the head movement direction and the movement amount, and moves the head on the basis of these data. Further, a speed parameter corresponding to the movement amount is read out from a ROM 405' in the servo control circuit 405 and output. Then, a value corresponding to the speed parameter is written into the speed instruction register 19 as a target speed instruction.

The encoder/decoder 8 is used for storing data in the disk 7, and can be formed of, for example, an MFM or a 1-7 encode/decode circuit.

Figure 5:
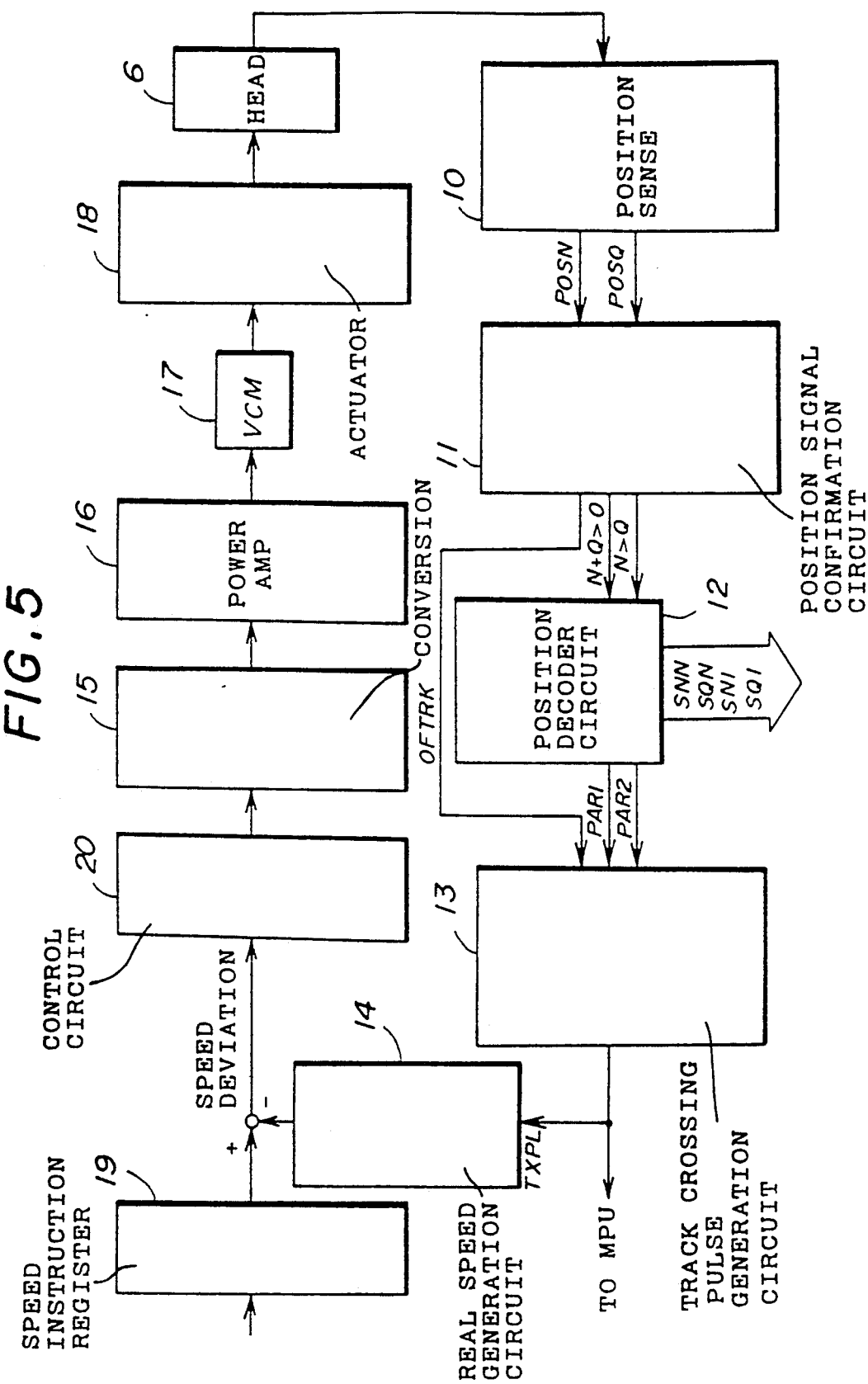
FIG. 5 is a block diagram of the encoder/encoder 8 in FIG. 4.

On the other hand, as shown in FIG. 5, the output of the servo head 6 is input to a position sense circuit 10. The position sense circuit 10 converts a readout signal of the serve head into a position signal, and outputs two-phase position signals POSN and POSQ to a position signal slice circuit 11.

The position signal slice circuit 11 generates signals N+Q>0 and N>Q from the signals POSN and POSQ, and outputs these signals to a position decoder circuit 12. Further, the position signal slice circuit 11 generates an OFTRK (off track) signal from the signals POSN and POSQ and outputs it to a track crossing pulse generation circuit 13.

The position decoder 12 generates, from the signals N>Q and N+Q>0, two low-order bits PAR2 and PAR1 of an address at which the head is now positioned. Further, the position decoder circuit 12 generates signals SNN (Select N Non-invert), SQN (Select Q Non-invert), SNI (Select N Invert) and SQI (Select Q Invert), which are conventional control signals used for generating a speed signal and a fine position signal indicating a linear area of the position signal. The track crossing pulse generation circuit 13 generates, from the signals PAR2 and PAR1 and the OFTRK signal, track crossing pulse TXPL which is generated at the center of the cylinder and which has a pulse width of 5 |μs ↑.

Figure 6:
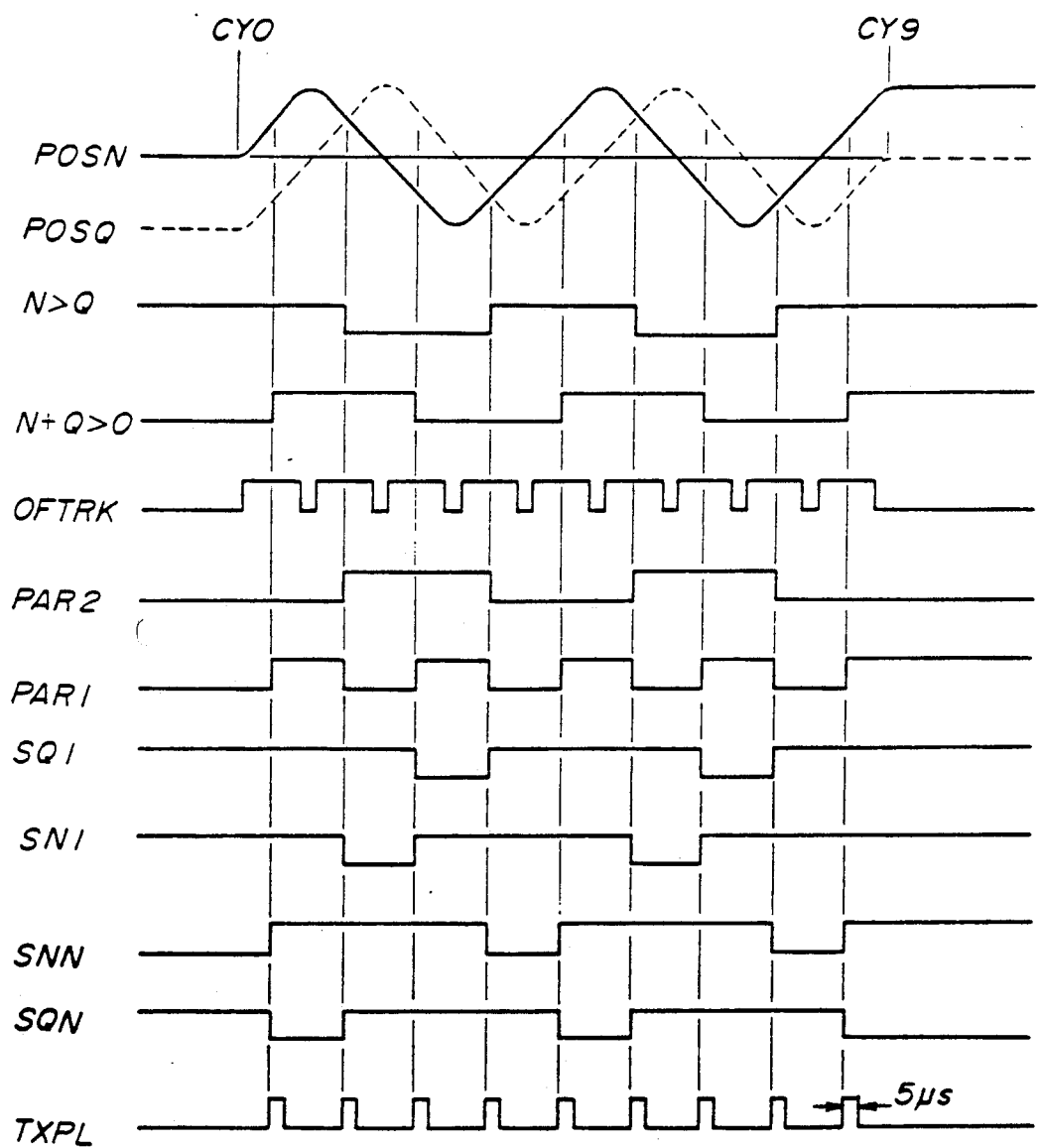
FIG. 6 is a timing chart showing the operation of the circuit of FIG. 5.

The waveforms of these signals are illustrated in FIG. 6.

Figure 2:
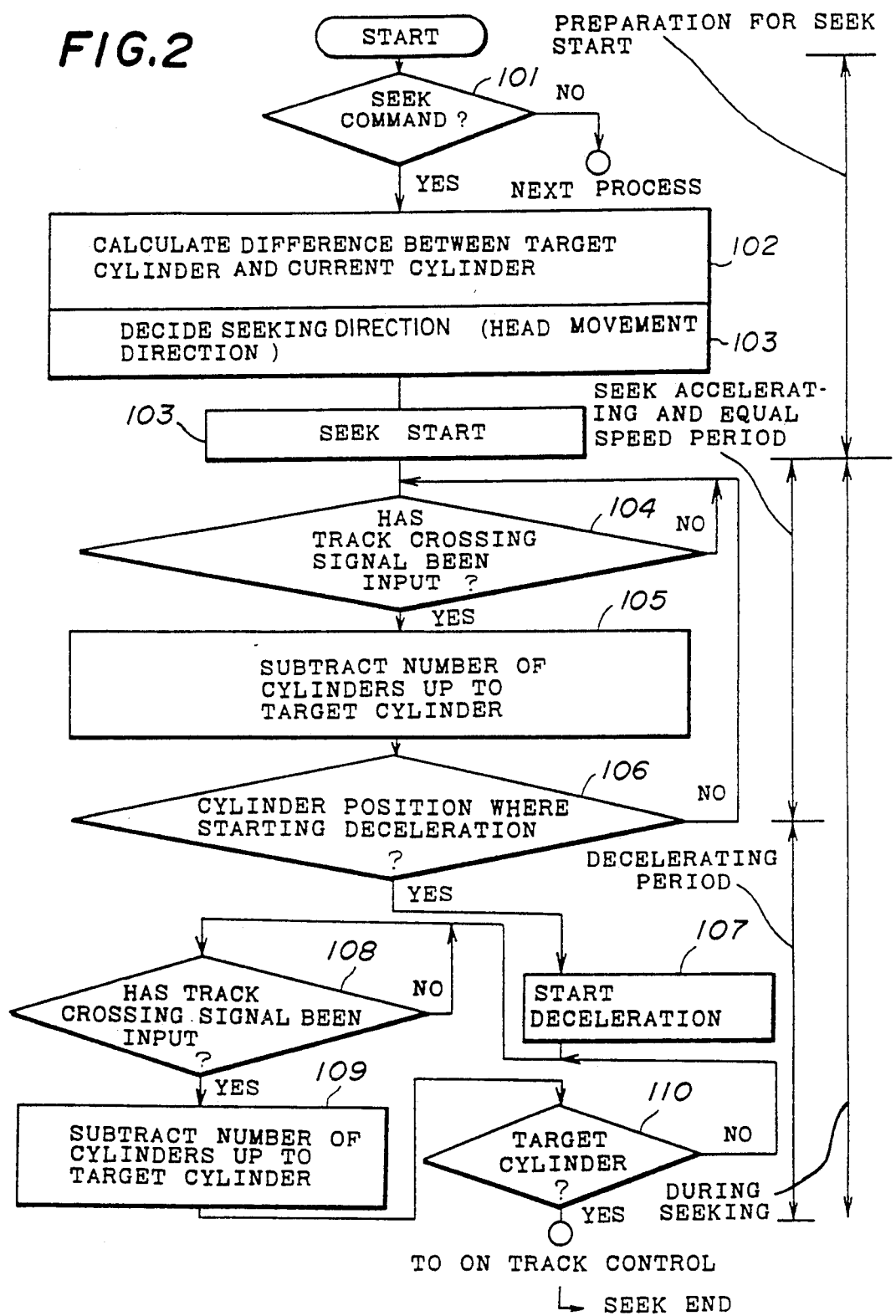
FIG. 2 is a flowchart showing the conventional seek operation.
Figure 3:
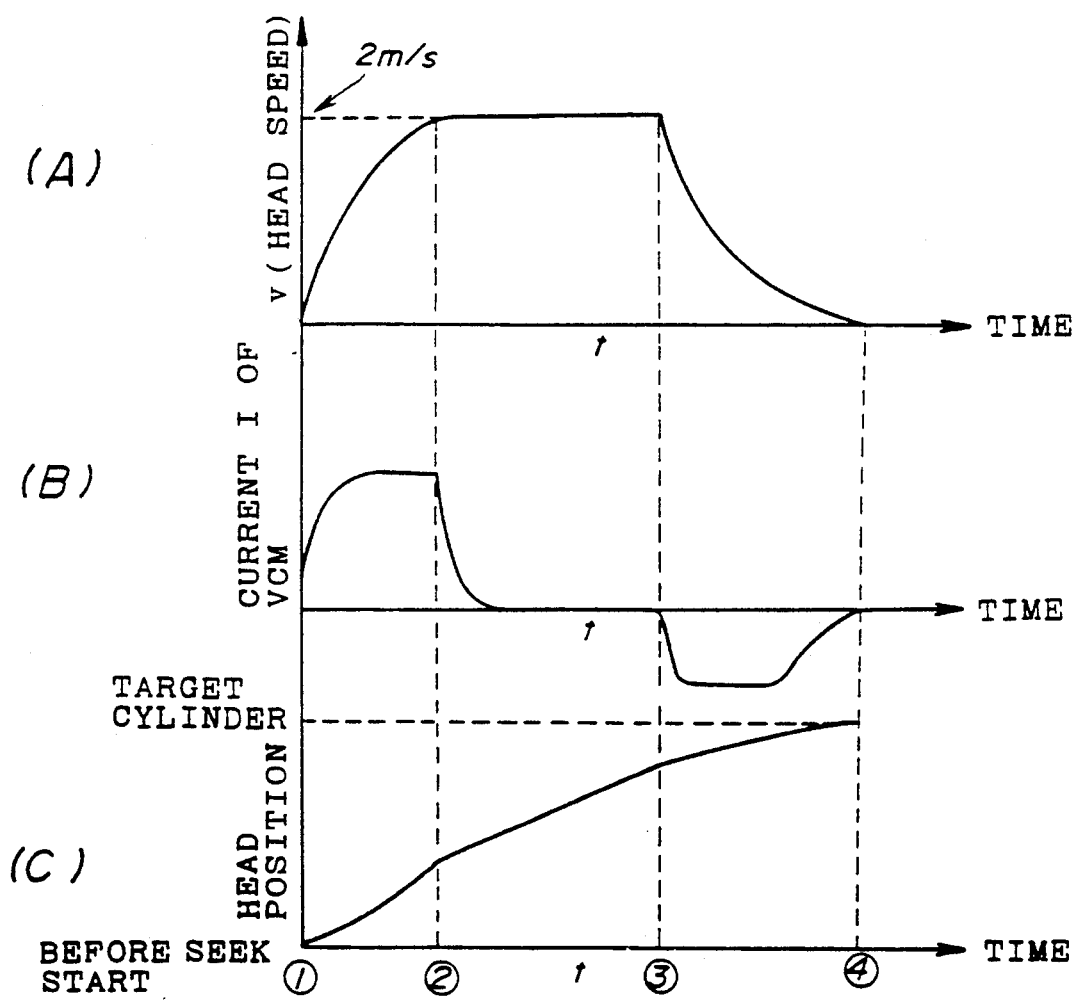
FIG. 3 is a waveform diagram showing the conventional seek operation.

The TXPL signal is also sent to the microprocessor 401, which decrements the value in the movement amount register 413 of the RAM 410 by 1 and increments the value in the movement amount counter 414 by 1 each time the TXPL signal is input in order to perform the seek control which has been described with reference to FIG. 2. The microprocessor 401 supplies the speed instruction register 19 shown in FIG. 5 with the value obtained by the above subtraction, and a target speed newly created by the ROM 405' in the same way as has been described previously.

The above-mentioned control is repeatedly carried out. When the current position of the head has reached a position where the movement of the head should be decelerated, the microprocessor 410 outputs the deceleration instruction to the servo control circuit 405. In the servo control circuit 405, a target speed of zero is written, in place of readout data from the ROM 405', into the speed instruction register 19 in order to decelerate the speed of the head, so that the servo system enters a decelerating state.

Further, the microprocessor 401 decrements the value in the movement amount register 401 in response to the TXPL signal. When the value in the movement amount register 401 becomes zero, the microprocessor 401 informs the high-order device 1 of the seek completion via the communication interfaces 403 and 306, the microprocessor 301 and the output port 303.

Then, the microprocessor 401 adds a value obtained when the seek is completed, that is, the value in the movement amount counter 414 to the value of the current cylinder 412, and completes the seek operation.

Further, the servo mechanism will be described with reference to FIG. 5. The TXPL signal is input to a real speed generation circuit 14, which calculates the real speed of the head 6 from the interval between the consecutive track crossing pulses (TXPL signals). The target speed instruction from the ROM 405' obtained in the aforementioned way is input to the speed instruction register 19. The target speed instruction is determined based on the data in the ROM 405', and sets an upper limit Vn of the movement speed of the head 6 allowing the acceptance of a command from the high-order device 1. That is, in order to accept a command from the high-order device 1 during the seek control, the upper limit which is lower than the conventional upper limit Vo of the head movement speed, is set. When the movement speed of the head 6 decreases, the interval between the consecutive TXPL signals increases. Thus, the microprocessor has an operational margin and can accept an interrupt process, so that it can always stop the seek operation definitely.

A speed deviation is obtained from the target movement speed in the speed instruction register 19 and the real speed, and a PID control circuit 20 executes a PID control based on the speed deviation. An output signal of the PID control circuit 20 is converted into an analog signal by a D/A converter 15. The analog signal is amplified by a power amplifier 16, and then input to a voice coil motor 17. The voice coil motor 17 receives an amplified current instruction value and drives an actuator 18, which moves the head 6.

The interface control circuit 3 shown in FIG. 4 decodes a command from the high-order device, and instructs, via the communication interfaces 306 and 403, the microprocessor 401 of the drive controller 4 to execute the seek operation when the decoded command is a seek command. Further, the interface control circuit 3 carries out a modification of a data recording format, instructions to write or read data, and a signal processing for data transfer to the high-order device 1 (protocol processing of level conversion and transfer). The drive controller 4 carries out a rotation control of the magnetic disk 7 (ON/OFF control of revolution and a servo control) and the aforementioned movement control of the head 6. Further, the drive controller 4 informs the interface control circuit 3 of read/write timing and an abnormality which occurs during the above-mentioned control.

Figure 1:
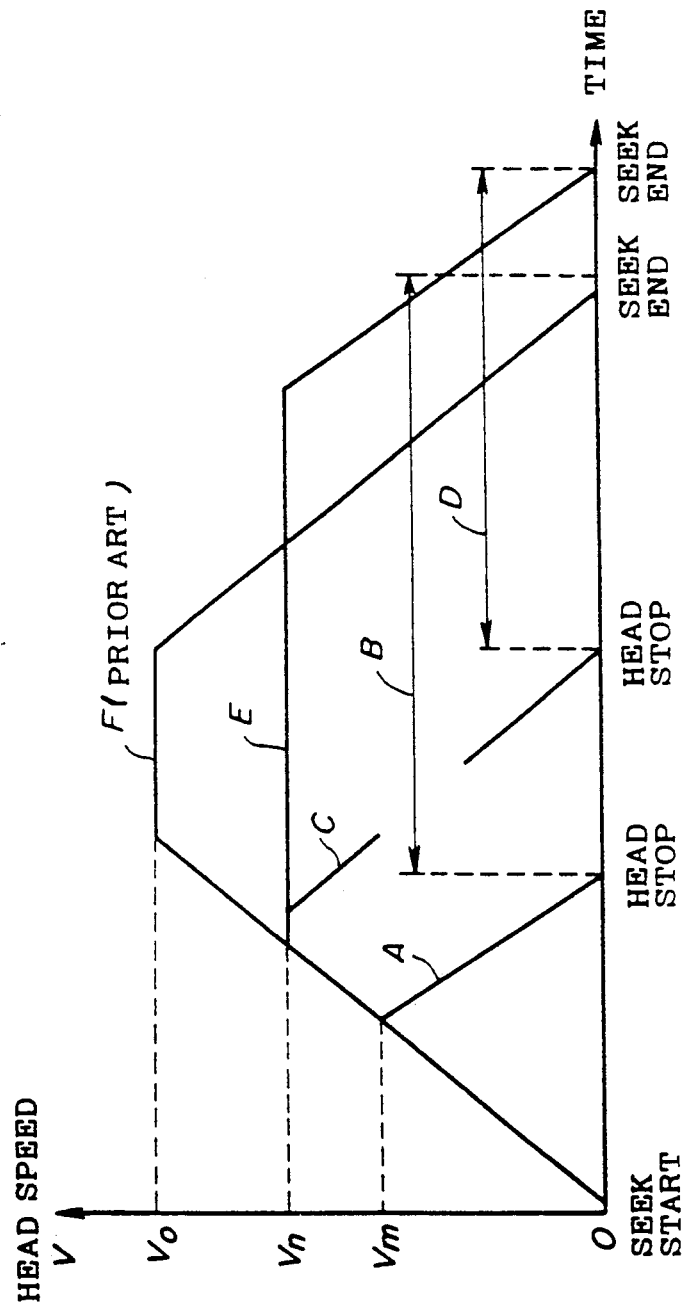
FIG. 1 is a diagram showing a conventional seek operation and a seek operation according to a first embodiment of the present invention.

A description will now be given of the operation of the first embodiment of the present invention with reference to FIG. 1. FIG. 1 shows the operation of the first embodiment in addition to the aforementioned conventional operation.

Referring to FIG. 1, Vn is the limit of the movement speed V of the head 6 at which the drive controller 4 can process an interrupt. The upper limit of the movement speed V of the head 6 is set to the limited speed Vn at which a command from the high-order device 1 can be accepted during the time between the seek start and seek end. At the limited speed Vn, it is possible to definitely stop the seek operation.

The head is accelerated until it has reached the limited speed Vn. If a command is input at a speed Vm lower than Vn, the head 6 is stopped, as shown by A shown in FIG. 1. B is the time difference between the conventional stop control and the stop control according to the present invention.

When the movement speed of the head 6 has become equal to Vn, the head 6 is controlled so that it moves at a fixed speed of Vn. When a command is input within a Vn uniform movement period, the head 6 is stopped, as shown by C. D is the time difference between the conventional stop control and the stop control according to the present invention.

A state in which no command is input until the seek ends after it starts is indicated by E. In this case, the head 6 is moved at the limited speed Vn lower than the conventional limited speed Vo. Although it takes a slightly long time to start the seek and then end it, as compared with the conventional control, an increased interval between the consecutive track crossing pulses is obtained since the movement speed of the head 6 is lower than that obtained in the conventional control. As a result, the speed control of the head carried out for each track crossing pulse has an operational margin, so that a command from the high-order device 1 can be accepted even midway in the seek control.

The above-mentioned operation will be described by taking a read/write command executed by the drive controller 4 as an example.

Figure 7:
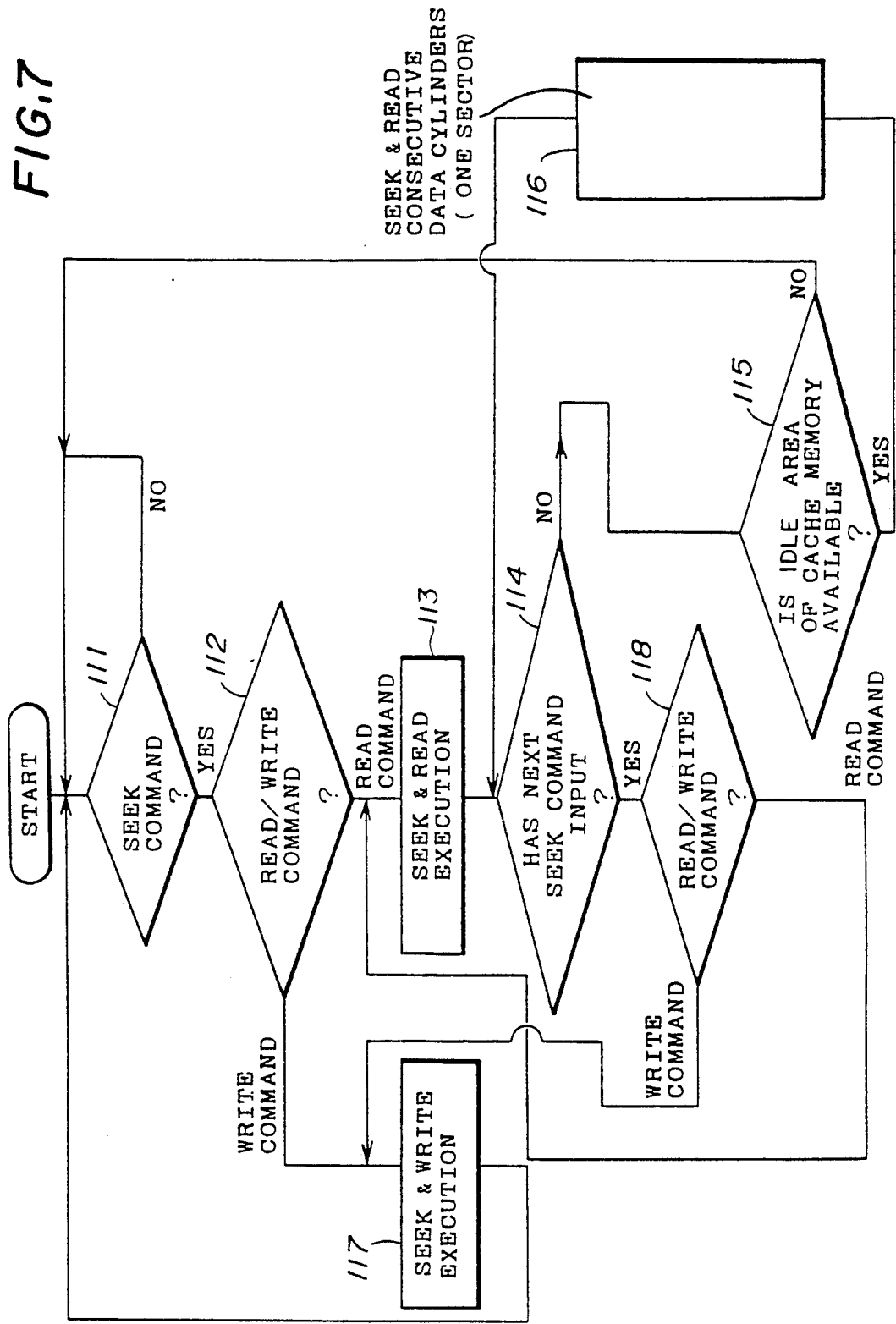
FIGS. 7 and 8 are flowcharts showing the operation of the embodiment of the present invention shown in FIG. 4.

Referring to FIG. 7, at step 111, the drive controller 4 determines whether or not a command from the interface control circuit 3 is the seek command. When the command from the interface control circuit 3 is the seek command, at step 112, the drive controller 4 judges whether the seek command results from a read command or a write command. When it is determined, at step 112, that the received command results from the write command, at step 117, the drive controller 4 executes the seek control of the head as described previously and data writing, and then returns to step 111.

On the other hand, when it is determined, at step 112, that the received command results from the read command, the drive controller 4 executes the seek control and data read at step 113. At step 114, the drive controller 4 determines whether or not the next seek command has been input. If the result is negative, the drive controller 4 judges, at step 115, whether or not there is an idle area in the cache memory 5 under the control of the microprocessor 301. If it is determined that an idle area is available, at step 116, the drive controller 4 executes the read operation on data subsequent to data read out by the read command, or data (for each sector) obtained by the data read ahead control.

The contents of the cache memory 5 are erased by the next incoming write command.

When it is determined, at step 114, that the seek command has been input, the drive controller 4 determines, at step 118, whether the seek command comes from the read command or write command. If the seek command results from the read command, at step 113, the drive controller 4 executes the seek control and data read. On the other hand, if the seek command results from the write command, the drive controller 4 executes the seek control and data write. At step 116, the drive controller 4 moves the head to an alternative sector if it appears during the read ahead control.

As has been described above, it becomes possible to improve the throughput since the movement speed V of the head 6 is set to the limited speed Vn at which the drive controller 4 can execute the interrupt process during the read ahead control so that the movement of the head 6 can be stopped immediately when a command is input during the seek control and can process the input command. Further, since the read ahead control to the alternative sector can be executed, it is possible to execute the seek control during the read ahead cache operation after the end of the normal seek control. Thus, the throughput can be increased.

According to the above-mentioned first embodiment of the present invention, the head 6 is moved at a speed at which the speed control can be stopped definitely and immediately when a command is generated during the seek control, and the command is processed.

Figure 8:
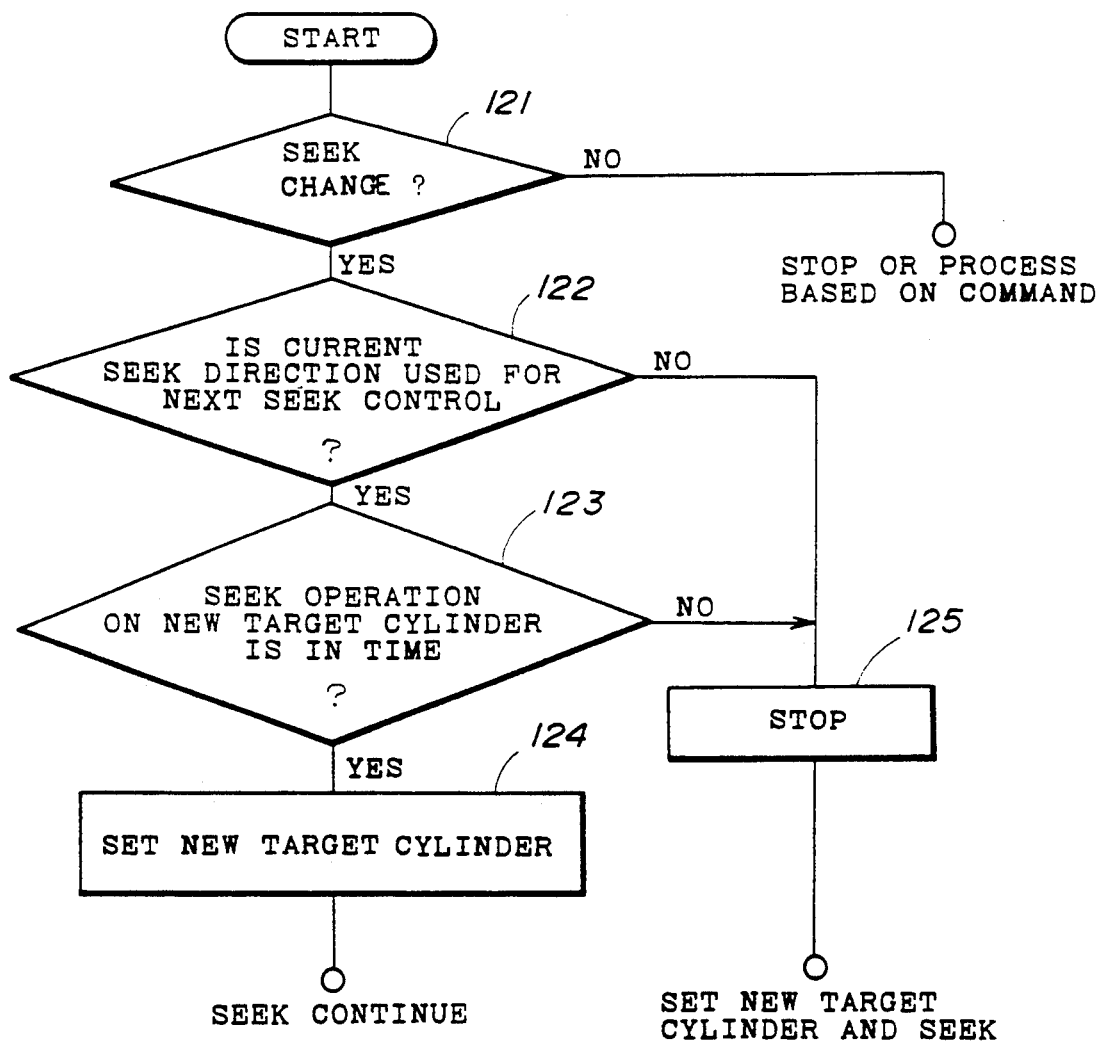

On the other hand, if a command generated during the seek control indicates a change of the target cylinder, it is possible to perform the control shown in FIG. 8 by only changing the target cylinder without immediately stopping the head 6.

The control shown in FIG. 8 is carried out by the drive controller 4 shown in FIG. 4. The processing shown in FIG. 8 is started when an interrupt occurs during the seek operation at step 116. At step 121 shown in FIG. 8, the drive controller 4 determines whether or not the generated command indicates a change of the target cylinder. That is, a target cylinder indicated by the command coincides with the cylinder which is the target of the seek control being carried out. If these target cylinders do not coincide with each other, the drive controller 4 immediately stops the movement of the head 6 or carries out a process indicated by the command after the end of the seek control. On the other hand, it is determined, at step 21, that the command indicates a change of the target cylinder, at step 122, the drive controller 4 discerns, on the basis of the content of the head movement register 411 and the target cylinder indicated by the command, whether or not the seek direction necessary to change the target cylinder is the same as the seek direction of the seek control being processed. When it is determined, at step 122, that both the directions do not coincide with each other, the drive controller 4 immediately stops the movement of the head 6 at step 125. During the stopping operation, the drive controller 4 sets the value in the movement amount counter 414 to zero, and sends the deceleration starting instruction to the servo control circuit 405. Then, the drive controller 4 counts track crossing pulses obtained until the head 6 stops, and identifies the track on which the head 6 stops by using the count value in the movement amount counter 414. Then, the drive controller 4 replaces the value in the register of the current cylinder 412. After that, the drive controller 4 resets the new target cylinder and newly starts the seek operation. On the other hand, when the result obtained at step 122 shows that both the directions coincide with each other, the drive controller 4 determines, at step 123, whether or not the seek control on the new target cylinder is in time. That is, the drive controller 4 determines whether or not the head has passed through the new target cylinder from the current cylinder position in the register 412 and the value in the movement amount counter 414. When the result of the determination at step 123 shows the head has already passed through the new target cylinder, the drive controller 4 executes step 125, at which step it immediately stops the movement of the head 6. On the other hand, when the result of the determination at step 123 shows that the head has not yet passed through the new target cylinder, the drive controller 4 sets the new target cylinder at step 124. That is, the value in the movement amount register 413 is replaced by the new target cylinder. Then, the seek operation is continuously carried out. At step 123, it is taken into account whether or not it is possible to stop the head 6 on the new target cylinder by starting deceleration from the present time. If the result at step 123 shows that it is impossible to stop the head on the new target cylinder, step 123 is executed.

A description will now be given of a second embodiment of the present invention with reference to FIG. 9.

Figure 9:
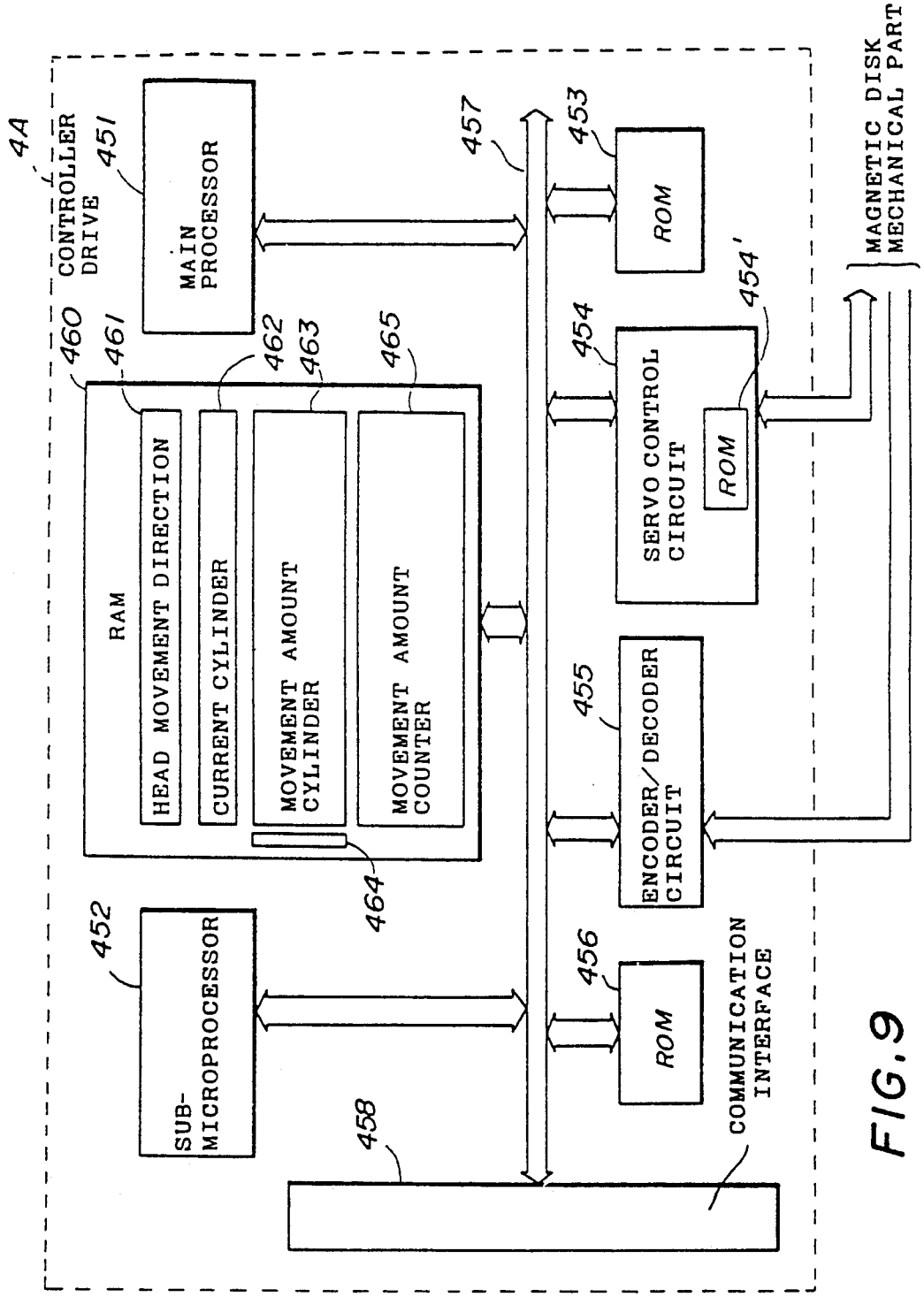
FIG. 9 is a block diagram of an essential part of a second embodiment of the present invention.

FIG. 9 shows the configuration of a drive controller 4A used in place of the drive controller 4 shown in FIG. 4.

The drive controller 4A is made up of a main microprocessor (MPU) 451 for carrying out a seek control, a sub-microprocessor (MPU) 452, a ROM 453 storing programs executed by the main microprocessor 451, a ROM 456 for storing programs executed by the sub-microprocessor 452, a RAM 460 which is accessed by both the main microprocessor 451 and the sub-microprocessor 452, a bus 457, an encoder/decoder circuit 455 and a servo control circuit 454.

The RAM 460 has various registers for the seek control in the same way as the previous first embodiment. In the second embodiment, a seek interrupt flag 464 is newly provided. Both the main processor 451 and the sub-microprocessor 452 can access the RAM 460 in common.

In the second embodiment, a communication interface 458 corresponds to the communication interface 403 shown in FIG. 4, and the servo control circuit 454 and a ROM 454' correspond to the servo control circuit 405 and the ROM 405' shown in FIG. 4, respectively. The encoder/decoder circuit 455 corresponds to the encoder/decoder 8 shown in FIG. 2. These devices operate in the same manner as the corresponding devices, and thus a description thereof is omitted.

Figure 10:
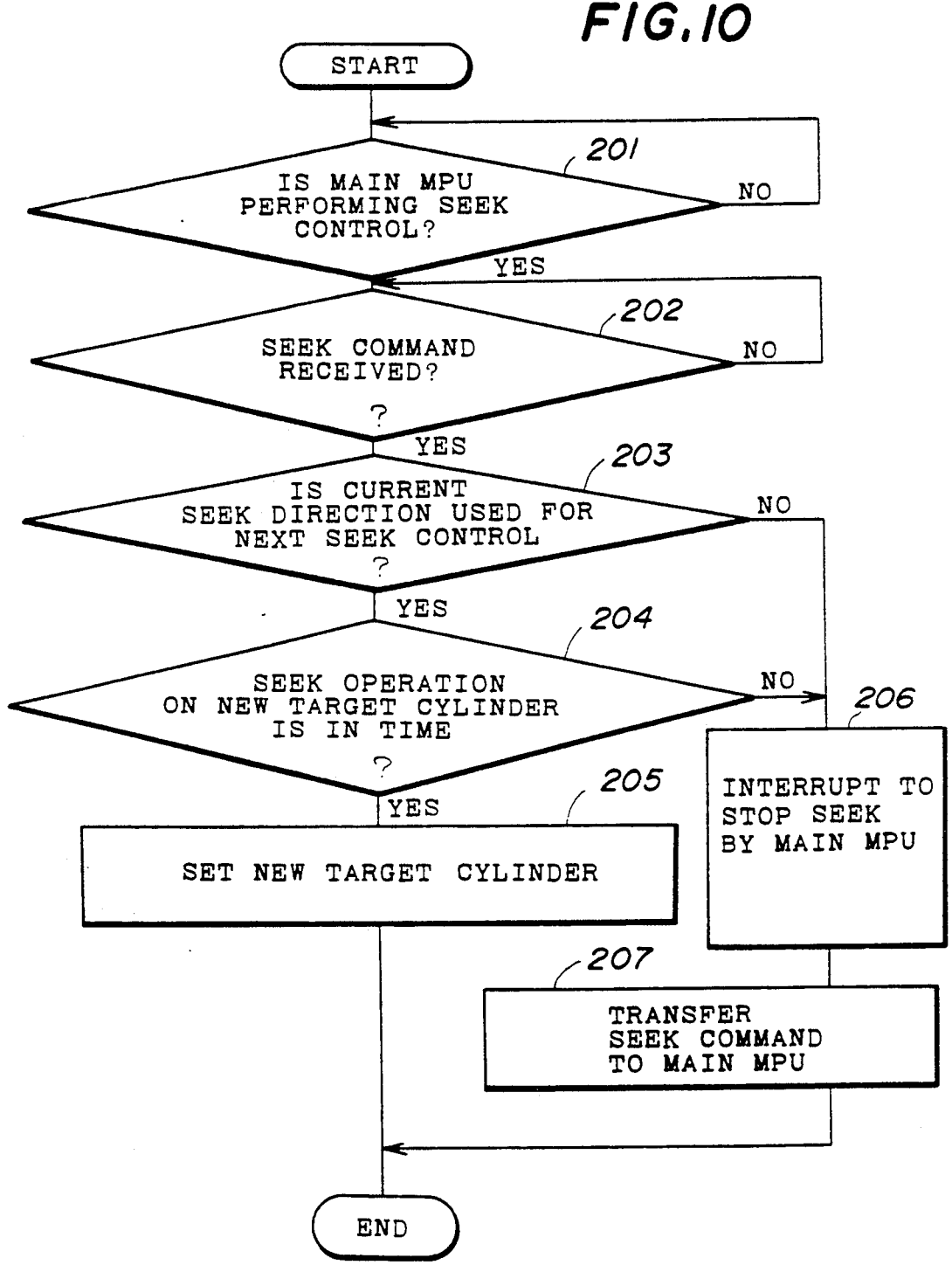
FIG. 10 is a flowchart showing the operation of the embodiment of the present invention shown in FIG. 9.

A description will now be given of the operation of the second embodiment with reference to FIG. 10. The operation shown in FIG. 10 is carried out during the seek control at step 116 shown in FIG. 7.

Normally, the sub-microprocessor 452 does not operate, and the main microprocessor 451 starts to operate by detecting the seek control of the head at step 116 shown in FIG. 7.

That is, at step 201, the sub-microprocessor 452 supervises the main microprocessor 451, and judges whether or not the main microprocessor 451 is performing the seek control in the read ahead operation. When the main microprocessor 451 starts the seek operation, the sub-microprocessor 452 executes the next step.

At step 202, the sub-microprocessor 452 supervises the receipt of the seek command from the high-order device 1 in place of the main microprocessor 451 when the main microprocessor 451 is performing the seek control. When the seek command is received, the sub-microprocessor 452 proceeds to the next step.

At step 203, the sub-microprocessor 452 decodes the seek command, and recognizes the new target cylinder specified by the seek command. Further, the sub-microprocessor 452 reads the contents of a head movement direction register 461, a current cylinder register 462, a movement amount register 463 and a movement counter 465, and judges whether or not the direction of the movement due to the head seek control being processed coincides with a movement direction toward the new target cylinder.

That is, the sub-microprocessor 452 identifies the current head position by reading information stored in these registers. This can be obtained by performing an addition or subtraction operation on the current cylinder register 462 and the value in the movement counter 465 on the basis of the head movement direction register 461. Thus, based on the result of the operation, the sub-microprocessor 452 determines whether or not both the directions are the same as each other.

If the seek direction toward the new target track is different from the seek direction of the seek control being processed, the sub-microprocessor 452 interrupts the processing of the main microprocessor 451 to stop the seek control. This interrupt is carried out by setting the interrupt flag 464. The main microprocessor 451 can read the interrupt flag 464 even if the head is moving at a high speed since the main microprocessor can accept the interrupt by reading the interrupt flag 464 during the seek operation.

The main microprocessor 451 reads the seek interrupt flag 464 in synchronism with the replacement of the movement amount register 463. If this flag is equal to "1", the main microprocessor 451 immediately outputs the deceleration instruction to the servo control circuit 454, and sets the value of the movement amount cylinder 463 to zero.

In this way, the main microprocessor 451 does not perform the receipt of the new seek command, the decoding operation thereon, steps 202 and 203, and steps 204 and 205 which will be described later, and instead the sub-microprocessor 452 executes these jobs in place of the main microprocessor 451. Thus, it becomes possible to accept the interrupt request during the seek operation while the head is moving at a high speed.

The main microprocessor 451 stops the seek operation of the head, and then informs the sub-microprocessor 452 of this stop. In response to this notification, the sub-microprocessor 452 transfers the seek command which is previously accepted at step 207.

On the other hand, when it is determined, at step 203, that the new seek command is the same as the seek command being processed, the sub-microprocessor 452 executes step 204, at which step it is determined whether or not the seek change to the new target cylinder is possible.

This determination is the same as step 123 except that it is carried out by the sub-microprocessor 452. If the seek change is still possible, the sub-microprocessor 452 writes an amount of movement to the new target cylinder in the movement amount register 463 of the RAM 460.

On the other hand, if the head has already passed through the new target cylinder or will pass over the new target cylinder even if it is decelerated, the sub-microprocessor 452 executes step 206.

As has been described above, it is possible to stop the seek control of the head without limiting the movement speed of the head 6 or by slightly reducing it.

According to the present invention, even when a command is input during the seek operation, it is possible to always stop the movement of the head and execute the command, so that an improved throughput can be obtained.

The present invention can provide a high-throughput magnetic disk apparatus or an opto-magnetic disk apparatus. Particularly, the present invention is suitable for a read ahead process in which successive areas formed in a semiconductor memory are formed, such as a cache memory, for the purpose of speeding up the hard disk apparatus. That is, it is possible to reduce the time necessary to interrupt the read ahead operation and start the new seek operation.

What is claimed:

1. A seek control method for a disk apparatus comprising the steps of:
   (a) performing a seek operation of moving a head from a first position on a recording medium to a second position under control of a processor which receives a first command from an external device;
   (b) setting a load state of the processor so that the processor can accept a command during said step (a);
   (c) determining whether or not a second command has been supplied to the processor from the external device during said step (a); and
   (d) stopping said step (a) of performing the seek operation of moving the head from the first position to the second position when it is determined in said step that the second command has been supplied to the processor.

2. A seek control method as claimed in claim 1, wherein said step (b) comprises the step of setting a movement speed of the head to a movement speed corresponding to a processing speed at which the processor can accept the second command.

3. A seek control method as claimed in claim 1, wherein said step (b) comprises the step of setting a movement speed of the head to a movement speed corresponding to an upper limit of a processing speed at which the processor can accept the second command.

4. A seek control method as claimed in claim 1, further comprising the step of executing the second command after stopping the seek operation.

5. A seek control method as claimed in claim 1, wherein said step (d) comprises the step of stopping the head on the recording medium.

6. A seek control method as claimed in claim 1, wherein:
   the second command indicates a seek operation of moving the head to a third position;
   said step (d) comprises the steps of:
   (d1) determining whether or not a first direction in which the head is moved to the second position in said step (a) is identical to a second direction in which the head is moved to the third position; and
   (d2) immediately stopping the head on the recording medium when it is determined by said step (d1) that the first direction is different from the second direction.

7. A seek control method as claimed in claim 6, further comprising the steps of:
   determining whether or not the head can move from a current position to the third position and stop at the third position when it is determined in said step (d1) that the first direction in the same as the second direction; and immediately stopping the head on the recording medium when it is determined that the head cannot stop at the third position.

8. A seek control method as claimed in claim 7, further comprising the steps of executing the second command and moving the head to the third position when it is determined that the head can stop at the third position.

9. A seek control method for a disk apparatus comprising:
(a) performing a seek operation of moving a head from a first position on a recording medium to a second position under control of a processor which receives a first command from an external device;
(b) determining whether or not a second command has been supplied to the first processor from the external device during said step (a); and
(d) stopping said step (a) of performing the seek operation of moving the head from the first position to the second position when it is determined in said step that the second command has been supplied to the first processor.

10. A seek control method as claimed in claim 9, further comprising the step of executing the second command after stopping the seek operation.

11. A seek control method as claimed in claim 10, wherein:
the second command indicates a seek operation of moving the head to a third position, further comprising:
determining, by using a second processor, whether or not the head can stop at the third position from a relationship between a current position of the head and the second position; and
stopping the head at the third position under control of the first processor when it is determined that the head can stop at the third position.

12. A seek control apparatus for a disk apparatus comprising:
first means for carrying out a seek operation of moving a head from a first position on a recording medium to a second position under control of a processor receiving a first command from an external device;
second means for setting a load state of said processor to a state where said processor can accept a command during the seek operation;
third means for determining whether or not a second command has been supplied from the external device during the seek operation; and
fourth means for stopping the seek operation of moving the head from the first position to the second position when said third means determines that the second command has been supplied to said processor 13. A seek control apparatus as claimed in claim 12, wherein said second means comprises means for setting a movement speed of the head to correspond to a processing speed at which said processor can accept the second command.

14. A seek control apparatus as claimed in claim 13, further comprising means for setting a movement speed of the head to correspond to an upper limit of a processing speed at which said processor can accept the second command.

15. A seek control apparatus as claimed in claim 13, further comprising means for executing the second command after the seek operation is stopped.

16. A seek control apparatus as claimed in claim 12, wherein said fourth means comprises means for stopping the head on the recording medium.

17. A seek control apparatus as claimed in claim 12, wherein:
the second command indicates a seek operation of moving the head to a third position, and
wherein said fourth means comprises:
means for determining whether or not a first direction in which the head is moved to the second position is identical to a second direction in which the head is moved to the third position from the current position; and
means for immediately stopping the head when it is determined that the first direction is different from the second direction.

18. A seek control apparatus as claimed in claim 17, further comprising:
means for determining whether or not the head can stop at the third position by moving the head from the current position when it is determined that the first direction is identical to the second direction; and
means for immediately stopping the head on the recording medium when it is determined that the head cannot stop at the third position.

19. A seek control apparatus as claimed in claim 18, further comprising means for executing the second command and for moving the head to the third position when it is determined that the head can stop at the third position.

20. A seek control apparatus for a disk apparatus comprising:
a first processor receiving a first command from an external device and carrying out a seek operation of moving a head from a first position on a recording medium to a second position thereon;
a second processor, coupled to the external device, for determining whether or not a second command has been supplied from the external device during the seek operation; and
means for stopping the seek operation of moving the head to the second position from the first position when said second processor determines that the second command has been supplied to said second processor.

21. A seek control apparatus as claimed in claim 20, wherein said first processor comprises for executing the second command under control of said first processor after stopping the seek operation.

22. A seek control apparatus as claimed in claims 21, wherein:
the second command indicates a seek operation of moving the head to a third position;
the second processor further comprises means for determining whether or not the head can stop at the third position from the current position from a relationship between the current position of the head and the second position; and
said first means comprises means for stopping the head at the third position when said means of said second processor determines that the head can stop at the third position.

23. A seek control apparatus as claimed in claim 20, further comprising memory means for storing data about the seek operation carried out by said first processor, wherein said second processor comprises means for referrring to the data in said memory means and for determining whether or not the second command can be executed after the seek operation.

24. A seek control method for a disk apparatus coupled to receive first and second commands, comprising the steps of:
(a) performing a seek operation under control of a processor which receives the first command;
(b) setting load state of the processor so that the processor can accept the second command during said step (a);
(c) determining whether the second command has been supplied to the processor during said step (a); and
(c) stopping said step (a) of performing a seek operation when it is determined in said step (c) that the second command has been received by the processor.

* * * * *

UNITED STATES PATENT AND TRADEMARK OFFICE
CERTIFICATE OF CORRECTION

PATENT NO. : 5,268,884  Page 1 of 2

DATED : DECEMBER 7, 1993

INVENTOR(S) : TSUTOMU KIUCHI ET AL.

It is certified that error appears in the above-identified patent and that said Letters Patent is hereby corrected as shown below:

TITLE PAGE [87] "WO91/04558" should be --WO91/04557--;

Title page, item [56], "4,925,828" should be --4,935,828--.

Col. 2, line 1, "being" should be deleted.

Col. 3, line 48, "2|m|s↑," should be --2µs,--;

line 50, "|µm↑," should be --µm--; and

"8.75 ns." should be --8.75 µs.--.

Col. 4, line 65, "encoder/encoder" should be --encoder/decoder--.

Col. 6, line 25, "head into" should be --head 6 into--;

line 47, "5|µs↑," should be --5 µs,--.

Col. 9, line 18, "speed" should be --seek--;
line 39, "21," should be --121,--.

UNITED STATES PATENT AND TRADEMARK OFFICE
CERTIFICATE OF CORRECTION

PATENT NO. : 5,268,884
DATED : DECEMBER 7, 1993
INVENTOR(S) : TSUTOMU KIUCHI ET AL.

It is certified that error appears in the above-identified patent and that said Letters Patent is hereby corrected as shown below:

Col. 12, line 29, "step that" should be --step (c) that--.

Col. 13, line 61, "13," should be --12,--.

Col. 14, line 49, "comprises for" should be --comprises means for--.

Col. 16, line 1, "setting load" should be --setting a load--.

Signed and Sealed this

Fifth Day of July, 1994

Attest:

BRUCE LEHMAN

Attesting Officer    Commissioner of Patents and Trademarks